(12) United States Patent
Yokochi et al.

(10) Patent No.: US 7,151,336 B2
(45) Date of Patent: Dec. 19, 2006

(54) ROTOR OF RELUCTANCE MOTOR

(75) Inventors: Takanori Yokochi, Aichi (JP); Motozumi Yura, Aichi (JP); Yoichi Kawai, Aichi (JP)

(73) Assignee: Okuma Corporation, Aichi (JP)

( * ) Notice: Subject to any disclaimer, the term of this patent is extended or adjusted under 35 U.S.C. 154(b) by 0 days.

(21) Appl. No.: 11/009,903

(22) Filed: Dec. 10, 2004

(65) Prior Publication Data

US 2005/0140238 A1 Jun. 30, 2005

(30) Foreign Application Priority Data

Dec. 24, 2003 (JP) ............................. 2003-428274

(51) Int. Cl.
*H02K 1/00* (2006.01)
(52) U.S. Cl. .................. 310/216; 310/156.53; 310/261
(58) Field of Classification Search ............................... 310/156.01–156.84, 216–218, 261, 168
See application file for complete search history.

(56) References Cited

U.S. PATENT DOCUMENTS

| | | | | |
|---|---|---|---|---|
| 2,680,822 A | * | 6/1954 | Brainard | 310/261 |
| 3,743,873 A | * | 7/1973 | de Jong | 310/165 |
| 4,841,186 A | * | 6/1989 | Feigel et al. | 310/156.12 |
| 6,242,833 B1 | * | 6/2001 | Mobius et al. | 310/156.01 |
| 6,259,181 B1 | * | 7/2001 | Kawano et al. | 310/162 |
| 2003/0020351 A1 | * | 1/2003 | Lee et al. | 310/156.53 |
| 2005/0023922 A1 | * | 2/2005 | Araki et al. | 310/168 |
| 2005/0104468 A1 | * | 5/2005 | Araki et al. | 310/156.53 |

FOREIGN PATENT DOCUMENTS

| | | |
|---|---|---|
| JP | 10014185 | 1/1998 |
| JP | 10150754 | 6/1998 |

* cited by examiner

*Primary Examiner*—Thanh Lam
(74) *Attorney, Agent, or Firm*—Gauthier & Connors LLP

(57) ABSTRACT

A plurality of projections are provided abutted with an outer circumference of a columnar axis inserted to an inner circumference of a rotor. The projections are provided in the direction of a magnetic pole in the rotor. When the rotor is fixed to the columnar axis, the projection parts are fixed by "plunge-in" and the other rotor inner circumference parts have an uniform clearance to the columnar axis. The clearance is filled with an adhesive agent, thereby fixing the rotor to the columnar axis.

2 Claims, 6 Drawing Sheets

ROTOR OF RELUCTANCE MOTOR

TECHNICAL FIELD

The present invention relates to a rotor of a reluctance motor. In particular, the present invention relates to an improved structure for fixing a ring-shaped lamination rotor and a columnar axis.

BACKGROUND ART

An electric motor has a rotor and an axis that are frequently provided as separate members. When they are provided as separate members, it is necessary to fix the rotor to the axis during assembly. One convenentional method is one in which the rotor is fixed to the axis using an adhesive will be described with reference to FIG. 5. FIG. 5 shows an example of a conventional method for adhering a rotor of an electric motor to be fixed to an axis. FIG. 5 shows a rotor 1, an axis 6, and adhesive agent 7. When the rotor 1 is adhered to be fixed to the axis 6, there a certain clearance is generally provided between the inner circumference of the rotor 1 and the outer circumference of the axis 6 because both the inner circumference of the rotor 1 and the outer circumference of the axis 6 have a size tolerance due to the machining process and a clearance is required not only to allow the rotor 1 to be inserted to the axis 6, but also to enable the adhesive agent 7 to have a fixed layer thickness as required by the adhesive agent employed to ensure that the desired adhesive force is provided. For this reason, a certain amount of clearance is provided between the inner circumference of the rotor 1 and the outer circumference of the axis 6, into which the adhesive agent 7 is filled when the rotor 1 is fixed to the axis 6.

Another method for fixing the rotor to the axis employs mechanical insertion or "plunge-in". When the rotor is "plunged-in" to the axis, the size of the rotor inner circumference and the size of the axis outer circumference have a negative clearance. That is, the rotor inner circumference is on the order of a few μm to a few dozen μm smaller than the outer circumference of the axis. As a result, the rotor cannot be manually inserted into the axis by a human and a machine such as a hydraulic press is used to apply sufficient force in the axis direction to insert the rotor to the axis, thereby fixing the rotor to the axis by a frictional force caused between the rotor and the axis.

As describe above, there are basically two commonly-employed methods for fixing the rotor to the axis in the electric motor, one being to provide a clearance between the rotor and the axis which is filled with an adhesive agent for fixing with an adhesion force, and the other being to use plunged-in force to fix the rotor and the axis by mechanical friction.

When the rotor is fixed to the axis by an adhesive agent, a clearance is provided as described above between the rotor inner circumference and the axis outer circumference. This clearance causes the rotor to rotate in an unbalanced manner. Specifically, when the rotor is adhered to the axis, it is very difficult to adhere the rotor to the axis in such a manner that the clearance between the rotor and the axis is constant at any point in the rotation direction. Thus, in many cases, the rotor is adhered to the axis in a condition where the rotor is not concentric with the axis, but is off-centered. When the size of a clearance between the rotor and the axis is determined, a clearance required for the adhesive agent to provide a desired adhesive force must be considered, and the size tolerance of the rotor caused when the rotor is obtained by laminating rotor elements manufactured by a press punching also must be generally considered. When such an tolerance is considered, not only the size tolerance of the rotor inner circumference caused by aging of the tool used for the punching process, but also the lamination tolerance caused when the laminated members in the axial direction are punched to provide a rotor must be considered. If the factors as described above are all taken into consideration, the clearance between the rotor and the axis has a significant large size. Such a clearance having a significant large size causes, when the rotor is adhered to the axis in a off-centered manner, the rotor to be enormously unbalanced. When such an unbalance is increased, the amount of the unbalance is generally corrected by cutting a particular part of the rotor or by adding weight to a particular part of the rotor. However, correction of such an excessively large amount of unbalance is very difficult.

On the other hand, when the rotor is fixed to the axis by "plunge-in", the rotor inner circumference and the axis outer circumference have a negative clearance as described above. When the rotor is inserted to the axis, the rotor is fixed to the axis while nearly equal pressures are applied to the respective points of the rotor inner circumference. Thus, the rotor is fixed to the axis while the rotor is almost concentric with the axis, and the center of the rotor commonly is no more than slightly displaced from the center of the axis. As a result, the amount of unbalance caused by the "plunge-in" method is very small compared to the adhesion method. However, when a reluctance motor has a rotor in which a plurality of slits for providing a magnetic pole are provided, another problem results, as will be described with reference to FIG. 6, which is an enlarged view of a portion of FIG. 5. The "plunge-in" method inserts the rotor to the axis while deforming the rotor inner circumference, thus applying an enormously large force to the rotor inner circumference. If the reluctance motor has a rotor in which slits are provided, the existence of the slits weakens the entire structure with respect to centrifugal force. Thus, when such an enormously large force is applied to the rotor inner circumference, the force has a significant influence on the rotor inner circumference.

In particular, a force is applied to the component denoted as "P6" in FIG. 6 in the direction "F6" because the distance between the inner circumference of the rotor 1 and the slit 3 is very small. However, the part P6 has a thin thickness to which the force is applied and, thus, the force applied to this part also has an influence on other parts of the rotor 1. For example, both connection parts shown by "2D" are applied with the force in the direction shown by "F7". Furthermore, when the rotor 1 is rotated to receive a centrifugal force, the stress applied to the connection part 2D is increased enormously. This stress exceeds a limitation of allowable stress of the material, thus breaking the connection part 2D.

In order to prevent this, either the part P6 or the connection part 2D must be made thicker for reinforcement. However, increasing the thickness of the part P6 requires the rotor 1 to have an increased outer diameter or other magnetic paths or the slit 3 to have a reduced thickness. However, in most cases, the outer diameter of the rotor 1 has an optimal relationship in size with the rotor provided at the exterior of the rotor 1. Thus, increasing the outer diameter of the rotor 1 leads to a decline in the generated torque and output. Reducing the thickness of other magnetic paths or the slit 3 in the rotor 1 also leads to a decline in generated torque and output. On the other hand, increasing the thickness of the connection part leads directly to an increase in the leakage of magnetic flux and thus also to a decline of generated torque and output. As described above, the "plunge-in" method to fix the rotor to the axis requires a particular part to have an increased thickness for reinforcement, thus causing a decline in the characteristics of the electric motor.

BRIEF SUMMARY OF THE INVENTION

The present invention advantageously solves the problem that, when the rotor is fixed to the axis by adhesion, a clearance between the rotor inner circumference and the axis outer circumference is increased to cause an amount of unbalance of the rotor and, when the rotor is fixed to the axis by "plunge-in" on the other hand, such unbalance is reduced but the stress by the "plunge-in" causes the breakage of the rotor.

In order to solve the above problem, the rotor of the reluctance motor of the present invention is characterized in that the inner circumference of a ring-shaped rotor have a plurality of projections abutted with the outer circumference of a columnar axis inserted into the ring-shaped rotor and the projection is provided so as to correspond to the direction of the magnetic pole in the rotor.

The present invention is may also be configured such that, while the projection part and the columnar axis are plunged-in to be fixed and the columnar axis is plunged-in to the projection of the ring-shaped rotor, a clearance between other rotor circumference parts other than the projection and the columnar axis is filled with adhesive agent to fix the rotor to the columnar axis.

Use of the present invention enables "plunge-in" of the rotor to the columnar axis at the projection part, even in the case of a rotor of a reluctance motor in which a plurality of slits are provided to provide a plurality of magnetic paths, to reduce the positional displacement of the rotor and the columnar axis, thereby reducing the amount of unbalance of the rotor. Furthermore, the projection is provided in the direction of the magnetic pole, and thus the stress caused by a "plunge-in" process can be applied to the magnetic path in the direction of the magnetic pole to disperse stresses that would have been concentrated if no plunge-in were used. As a result, the connection part can have a reduced thickness and torque and output generated in the electric motor can be increased.

BRIEF DESCRIPTION OF THE DRAWINGS

Preferred embodiment(s) of the present invention will be described in detail based on the following figures, wherein.

DETAILED DESCRIPTION OF THE INVENTION

Figure 1:
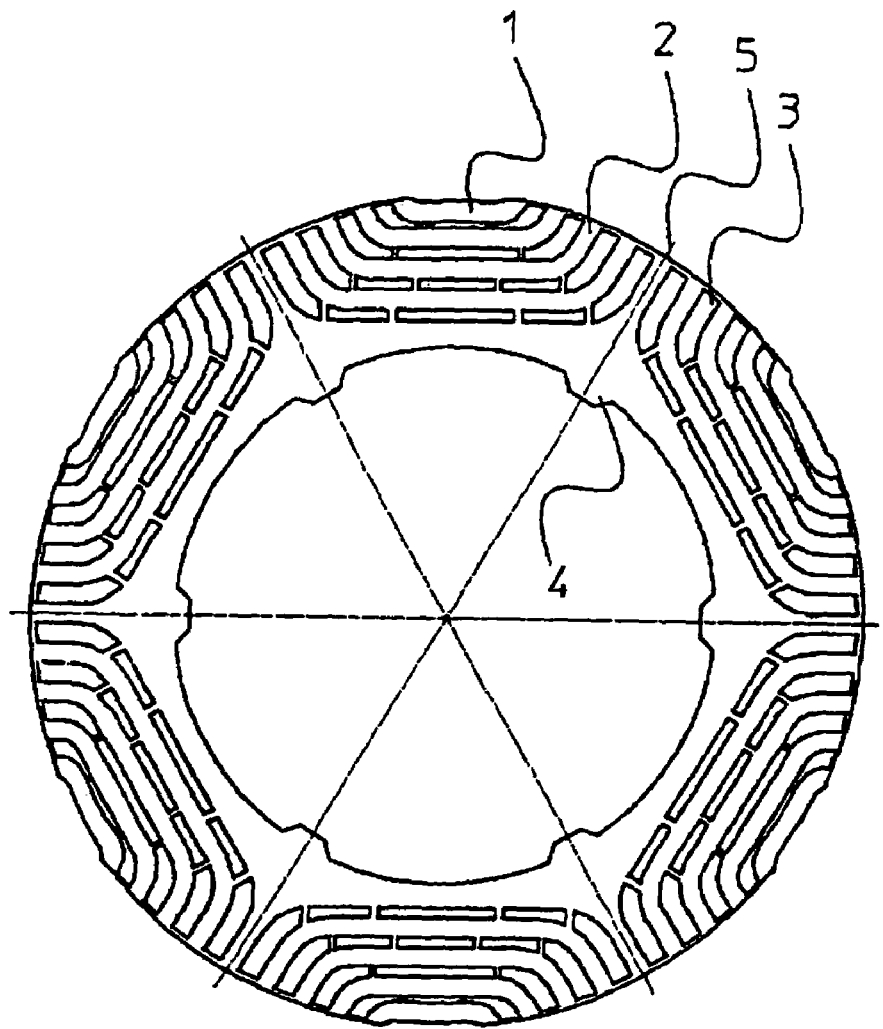
FIG. 1 shows an example of the structure of a rotor in the present invention.
Figure 2:
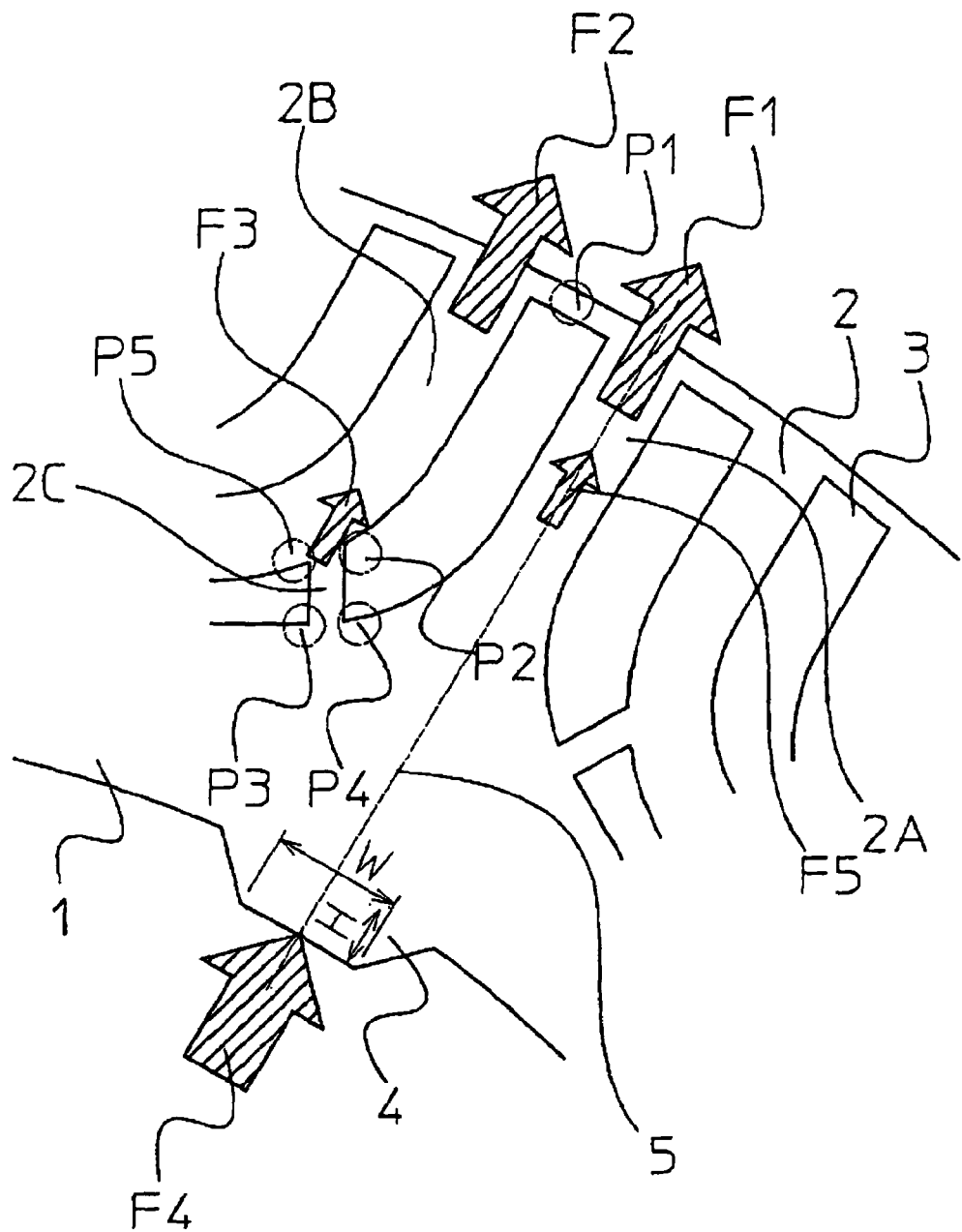
FIG. 2 illustrates the position of the projection and the stress and the displacement in FIG. 1.

FIG. 1 is a cross-sectional view of a rotor of a reluctance motor of the present invention. FIG. 1 shows a rotor 1, a magnetic path 2, a slit 3, and a projection 4 which is a feature of the present invention. As shown in FIG. 1, in the rotor 1 are provided a plurality of slits 3 that constitute the magnetic path 2 and a magnetic pole center 5. FIG. 2 is an enlarged view of the vicinity of the magnetic pole in FIG. 1. As shown in FIG. 2, each projection 4 is provided in the direction of the radius of each magnetic pole center 5. The projection 4 has a width W of about few mm and a height H of about few μm to a few dozen μm. In FIG. 1 and FIG. 2, although the actual size of the projection 4 is significantly smaller than that of the rotor 1, only the projection 4 is conveniently illustrated to be larger so that the shape thereof can be clearly understood.

Figure 3:
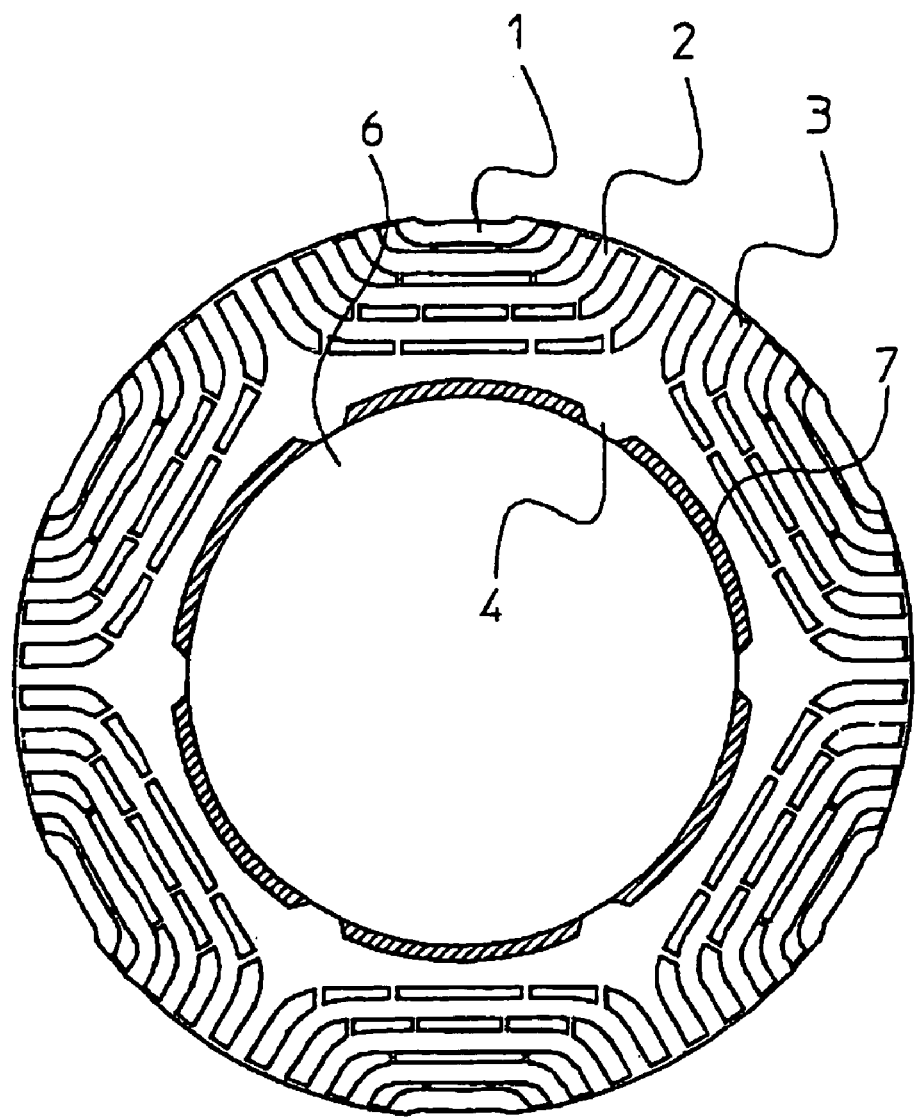
FIG. 3 shows an example of the structure in the present invention in which the rotor is adhered to the columnar axis.

The rotor 1 in which the projections 4 are provided at the positions as described above has an inner circumference (where no projection) as shown in FIG. 3, which is larger than the inner circumference of a comparable prior art rotor, so as to have an uniform clearance to the outer circumference of the columnar axis 6. Thus, when the rotor 1 is fixed to the columnar axis 6, adhesive agent 7 is filled as shown in FIG. 3 to the clearance between the rotor 1 and the columnar axis 6 where no projection 4 is provided. The plunged-in projection 4 has a small width and small frictional force is caused that is not enough to fix the rotor 1 to the columnar axis 6. A main objective of "plunge-in" the projection 4 is to reduce the positional displacement of the rotor 1 to the columnar axis 6. Thus, the rotor 1 is fixed to the columnar axis 6 mainly by the adhesive force of the adhesive agent 7.

It should be noted that the projection 4 has a width W of about few mm as described above. The greater the increase in this width, the greater is the "plunge-in" force which must be applied to the rotor 1. Thus, this width is preferably made as small as possible. However, when the projection 4 has an excessively small width, the projection 4 is broken when being plunged in. Thus, the width W of the projection 4 is preferably about few mm. On the other hand, the height H can be determined based on the accuracies of the respective parts.

Figure 4:
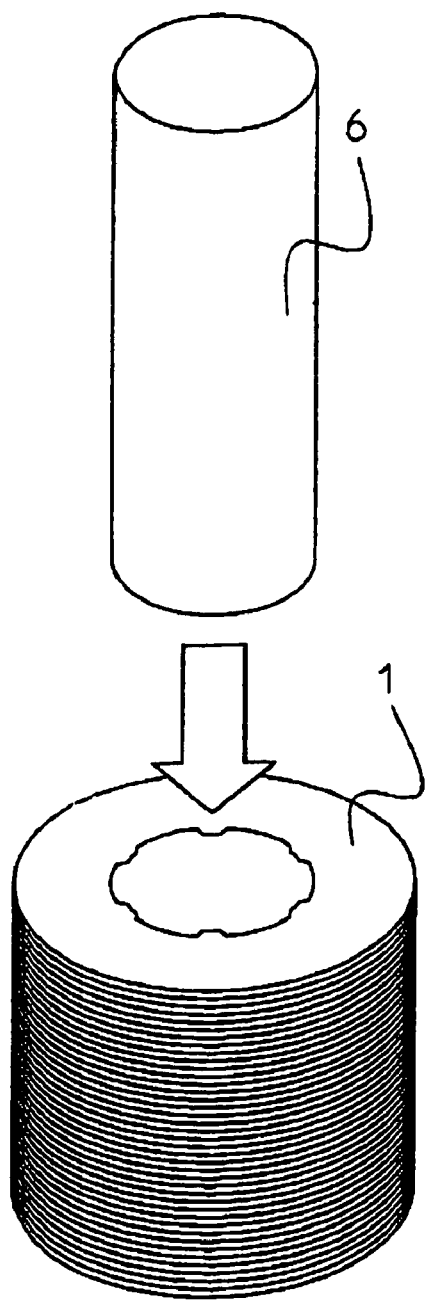
FIG. 4 shows an example in which the rotor is plunged-in to the columnar axis.
Figure 5:
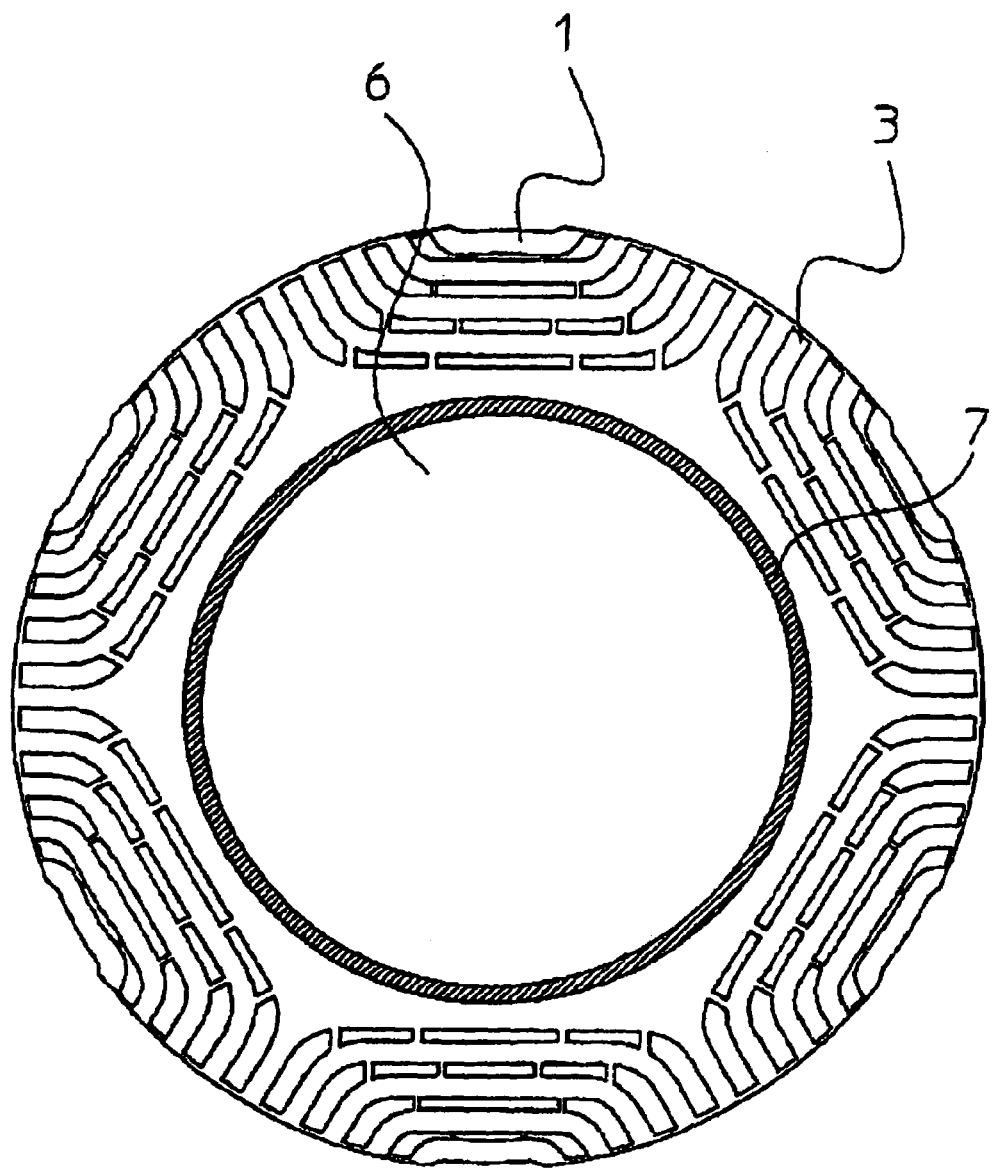
FIG. 5 shows an example of the structure in prior art in which the rotor is adhered to the columnar axis.
Figure 6:
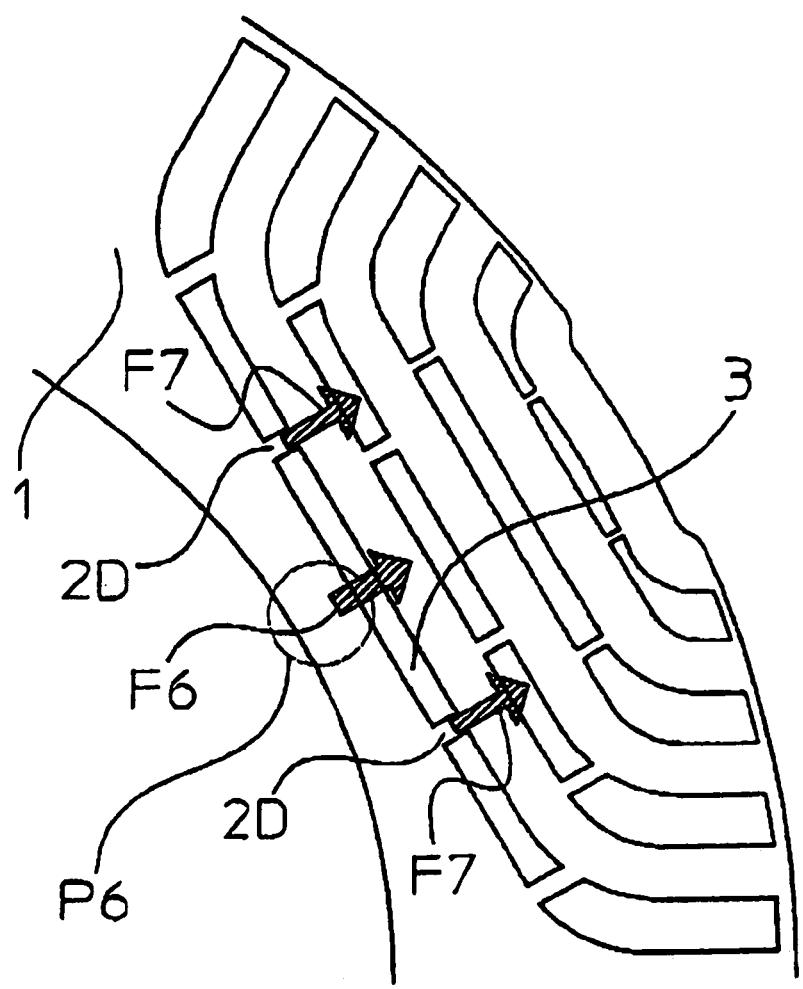
FIG. 6 illustrates the stress by "plunge-in" in prior art.

When the rotor 1 is plunged in to the columnar axis 6 as shown in FIG. 4, the amount of tightening clearance used to "plunge-in" each projection 4 to each element of the rotor 1 is determined by the dimensional accuracy of each part. Primarily the three tolerances of the size tolerance of the inner circumference of the projection 4 of the rotor 1 are considered; the lamination tolerance caused when the rotor 1 is laminated in the axial direction; and the size tolerance caused when the outer circumference of the columnar axis 6 is machined. It is noted that the size tolerance of the inner circumference of the rotor 1 includes abrasions due to the aging of the tool used for punching out the rotor 1. The lamination tolerance of the rotor 1 may be ignored because it is assimilated in the columnar axis at "plunge-in" process. Thus, two types of imperfections are related to "plunge-in" process of the rotor 1 to the columnar axis 6: the size tolerance of the inner circumference of the projection 4 of the rotor 1 and the size tolerance of the outer circumference of the columnar axis 6. A value obtained by adding the former tolerance to the latter tolerance is assumed as the minimum value of a negative clearance at "plunge-in". The negative clearance at "plunge-in" is the difference between the outer circumference of the columnar axis 6 and the inner circumference of the projection 4. A value obtained by adding this clearance to the clearance required to provide a desired adhesion force to adhere the rotor 1 to the columnar axis 6 is assumed as the height H of the projection 4. The height H of the projection 4 can be determined based on the calculation as described above.

Next, the stress applied to the respective parts of the rotor 1 and the displacement when the rotor 1 is plunged in at the projection 4 will be described.

When no "plunge-in" is performed, and only adhesion, for example, is used to fix the rotor 1 to the columnar axis 6, the only force applied to the rotor 1 as a centrifugal force caused when the rotor 1 is rotated. In FIG. 2, when a magnetic path at the center of the magnetic pole is 2A and the neighboring magnetic path is 2B while a centrifugal force applied to the magnetic path 2A is F1 and a centrifugal force applied to the magnetic path 2B is F2, the magnetic path 2A can support the centrifugal force F1 by the thick portion in the vicinity of the inner circumference, although the magnetic path 2B must support the centrifugal force F2 by the connection part 2C. In an actual case, the connection part 2C is applied with a force F3 caused by the centrifugal force F2 and, thus, the parts P2 and P3 in particular receive concentrated stress. The respective parts of the rotor 1 are displaced due to the centrifugal force. When the magnetic path 2A is compared with the magnetic path 2B with regards to the displacement, the magnetic path 2B has a larger displacement. Thus, the difference of displacement between the former and the latter causes a distortion at the part shown by "P1", thus causing stress to concentrate on the part P1. In order to prevent such concentration of stress, the connection part 2C or the connection part shown by "P1" must have an increased thickness. However, increasing the thickness of one of such connection parts causes an increase in the magnetic flux passing the connection part (i.e., leakage of magnetic flux), thus in turn causing the decline of torque and output. Thus, when the shape of the rotor 1 is actually designed considering only the centrifugal force, connection parts among the respective parts are made as thin as possible so that the concentration of stress caused at each part is within the range of the allowable stress.

On the other hand, when only the projection 4 is plunged-in, the plunged-in force F4 causes the magnetic path 2A to receive not only the centrifugal force F1 but also the force F5. As a result, forces applied to the respective parts are changed as compared to a case where no "plunge-in" is performed. Specifically, in the connection part 2C, the magnetic path 2A is drawn to the exterior to cause the force applied to the parts P4 and P5, thus causing the forces that have been concentrated on the parts P2 and P3 to disperse throughout the entire body of the connection part 2C. This enables size reduction of the connection part 2C. Because the magnetic path 2A has an increased displacement, the difference in displacement with the magnetic path 2B is reduced, an eliminating the distortion at the part P1 and, as a result, the concentration of stress. Thus, the thickness of the connection part P1 can also can be reduced.

What is claimed is:

1. A ring-shaped rotor of a reluctance motor in which a plurality of slits are provided to form a plurality of magnetic paths, wherein:

the ring-shaped rotor has at the inner circumference thereof a plurality of projections abutted with an outer circumference of a columnar axis inserted into the ring-shaped rotor for reducing a positional displacement of the rotor with respect to the columnar axis, and the projections, having small widths but are sufficiently large that the projections are not broken when being plugged in, are provided so as to correspond to the direction of a magnetic pole of the rotor and stress caused by being plugged in can be applied to the magnetic path in the direction of the magnetic pole to disperse stress.

2. The rotor of a reluctance motor according to claim 1, wherein:

the projection parts and the columnar axis are fixed by plunged-in, and while the columnar axis is being plunged in to the projection of the ring-shaped rotor, a clearance between rotor circumference parts other than the projections and the columnar axis is filled with an adhesive agent for fixing the rotor to the columnar axis.

* * * * *